(12) United States Patent
Bakshi et al.

(10) Patent No.: US 10,311,423 B2
(45) Date of Patent: Jun. 4, 2019

(54) SYSTEM AND METHOD FOR TRANSACTION APPROVAL BASED ON CONFIRMATION OF PROXIMITY OF MOBILE SUBSCRIBER DEVICE TO A PARTICULAR LOCATION

(71) Applicant: ZUMIGO, INC., San Jose, CA (US)

(72) Inventors: Chirag C. Bakshi, San Jose, CA (US); Partha Roy Chowdhury, Los Altos, CA (US); David Aaron Pinski, Narbeth, PA (US)

(73) Assignee: ZUMIGO, INC., San Jose, CA (US)

( * ) Notice: Subject to any disclaimer, the term of this patent is extended or adjusted under 35 U.S.C. 154(b) by 708 days.

(21) Appl. No.: 14/735,042

(22) Filed: Jun. 9, 2015

(65) Prior Publication Data
US 2016/0364716 A1    Dec. 15, 2016

(51) Int. Cl.
*G06Q 20/32* (2012.01)
*G06Q 20/20* (2012.01)

(52) U.S. Cl.
CPC ....... *G06Q 20/3224* (2013.01); *G06Q 20/204* (2013.01); *G06Q 20/327* (2013.01)

(58) Field of Classification Search
CPC ................................................. G06Q 20/3224

USPC ........................................................... 705/44
See application file for complete search history.

(56) References Cited

U.S. PATENT DOCUMENTS

| | | | |
|---|---|---|---|
| 7,418,267 B2 | 8/2008 | Karaoguz | |
| 7,992,777 B1 | 8/2011 | Block et al. | |
| 9,083,853 B2 * | 7/2015 | Shkedi | H04N 7/17318 |
| 9,646,325 B2 * | 5/2017 | DeWitt | G06Q 30/0261 |
| 2010/0174649 A1 | 7/2010 | Bouchard | |
| 2011/0202416 A1 | 8/2011 | Buer et al. | |
| 2015/0082459 A1 * | 3/2015 | Kelly | H04L 63/10 |
| | | | 726/28 |

* cited by examiner

*Primary Examiner* — Jessica Lemieux
(74) *Attorney, Agent, or Firm* — Kim & Stewart LLP

(57) ABSTRACT

A user activity, which may be a debit or credit card transaction or an online access, is approved, or proximity between two users is confirmed, based on a response or other acknowledgement from a mobile subscriber terminal. The mobile subscriber terminal acknowledgement is generated in response to a query from an authorizing entity associated with the debit or credit card, or another mobile subscriber terminal, and indicates whether or not the mobile subscriber terminal is within a maximum allowable radius from a specific location included in the query. It is noted that no specific location information is included in the mobile subscriber terminal acknowledgement. An application downloaded to the mobile subscriber terminal may generate the above-described acknowledgement.

12 Claims, 8 Drawing Sheets

| USER ID | MSC ID | LOCATION | SUBTENDING CELLS | LOCATION |
|---|---|---|---|---|
| ... | ... | ... | ... | ... |
| (aaa)(bbb)(ccc) | (xxx)(yyy) | London, England | Cell-Tower-a | Piccadilly |
| | | | Cell-Tower-a | Kensington |
| | | | Cell-Tower-a | Chelsea |
| ... | ... | ... | ... | ... |

SYSTEM AND METHOD FOR TRANSACTION APPROVAL BASED ON CONFIRMATION OF PROXIMITY OF MOBILE SUBSCRIBER DEVICE TO A PARTICULAR LOCATION

BACKGROUND OF THE INVENTION

It has become common practice for individual consumers to use credit cards for conducting transactions not only at conventional point-of-sale (POS) locations, but also for online transactions performed on the Internet. However, the convenience of credit card transactions is often negated by security measures commonly used to prevent fraudulent transactions, since transactions may be unexpectedly denied and additional action must be taken by the user to complete a transaction.

For instance, in POS credit and debit card transactions, a bank or other authorization entity associated with the credit or debit card (hereinafter referred to as "the card") may deny any requested transactions that fall outside the normal pattern of use for that particular card, such as when the card is used for a transaction in a different city or state than the residence of the card user. When such transaction denials occur, the card user may be required to contact the authorization entity via a customer service phone number for transaction authorization, a procedure that can be time-consuming, frustrating, and, in cases where the user is engaged in foreign travel, quite expensive.

In online credit card transactions, particularly those exceeding a specified dollar amount, an authorization entity associated with the card may require two-factor authentication of the user before authorizing a requested transaction. For example, a personal identification number (PIN) or other alpha-numeric credential may be sent via text message to a mobile subscriber terminal, e.g., a mobile phone, that has been pre-registered as the mobile device of the card user. The user then enters the PIN to verify his or her identity to the authorization entity, which then authorizes the requested transaction. However, two-factor authentication using text messaging can be problematic, since text messaging adds cost to each transaction, is not always reliably received by a targeted mobile device in a timely manner, and not all mobile device users have text messaging plans.

Consequently, more convenient techniques have been used for two-factor authentication of both online and POS transactions. Specifically, the current location of a card user's mobile subscriber terminal has been used for two-factor authentication of card transactions; proximity of the card user's mobile subscriber terminal to the POS or the IP address associated with the transaction can indicate that the actual user of the card is requesting the transaction. Determination of the current location of the card user's mobile subscriber terminal can be a completely automated process, and therefore transparent to the card user, which is a significant benefit. Unfortunately, such two-factor authentication generally requires a card user's mobile subscriber terminal to continuously provide location information to the card's authorization entity, and in light of current concerns about electronic privacy, this requirement may be considered a serious drawback by many consumers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 schematically illustrates the contents of a location mapping database, according to an embodiment of the invention.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
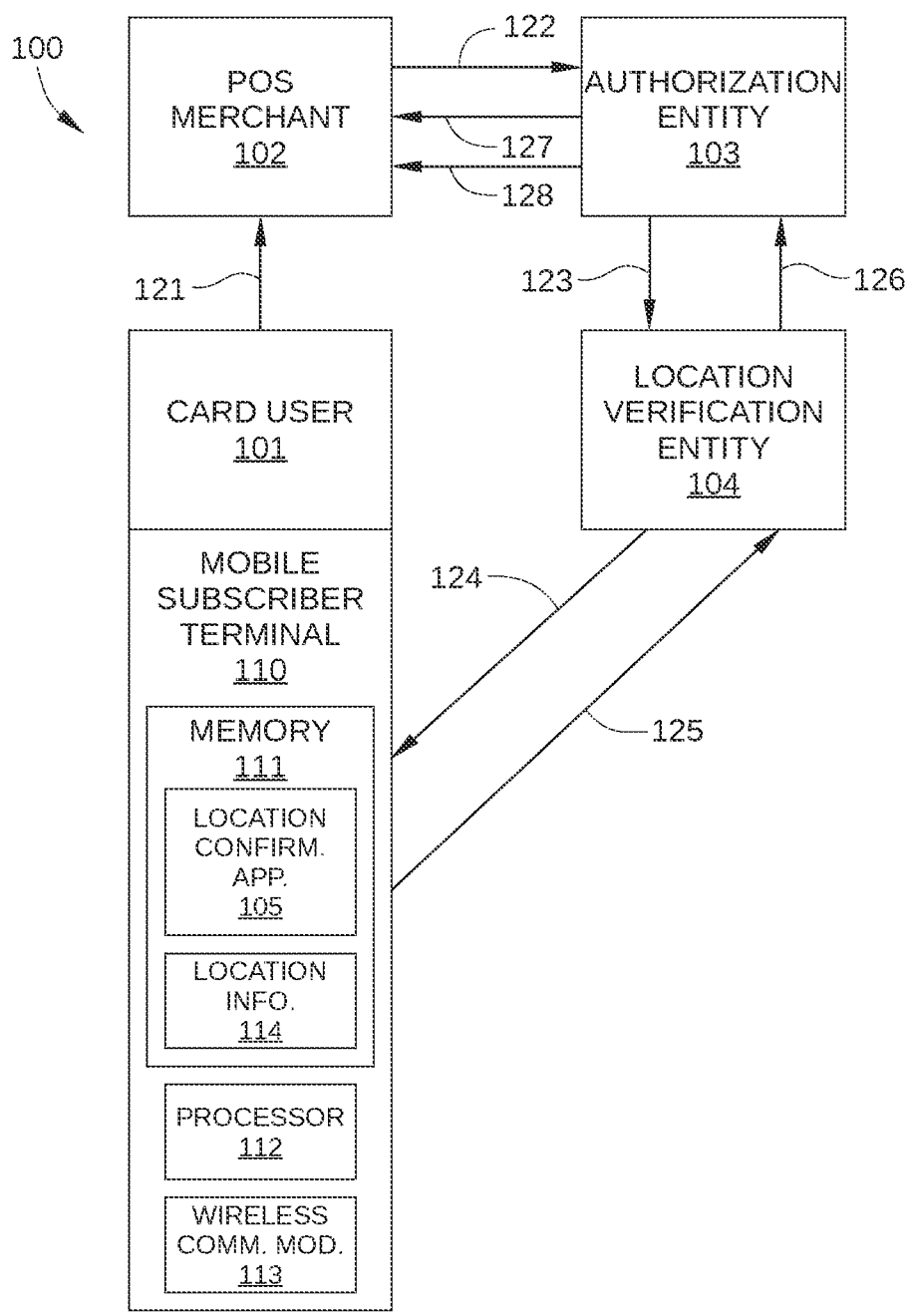
FIG. 1 is a block diagram of a transaction processing system and a point-of-sale (POS) financial transaction carried out according to an embodiment of the present invention.
Figure 2:
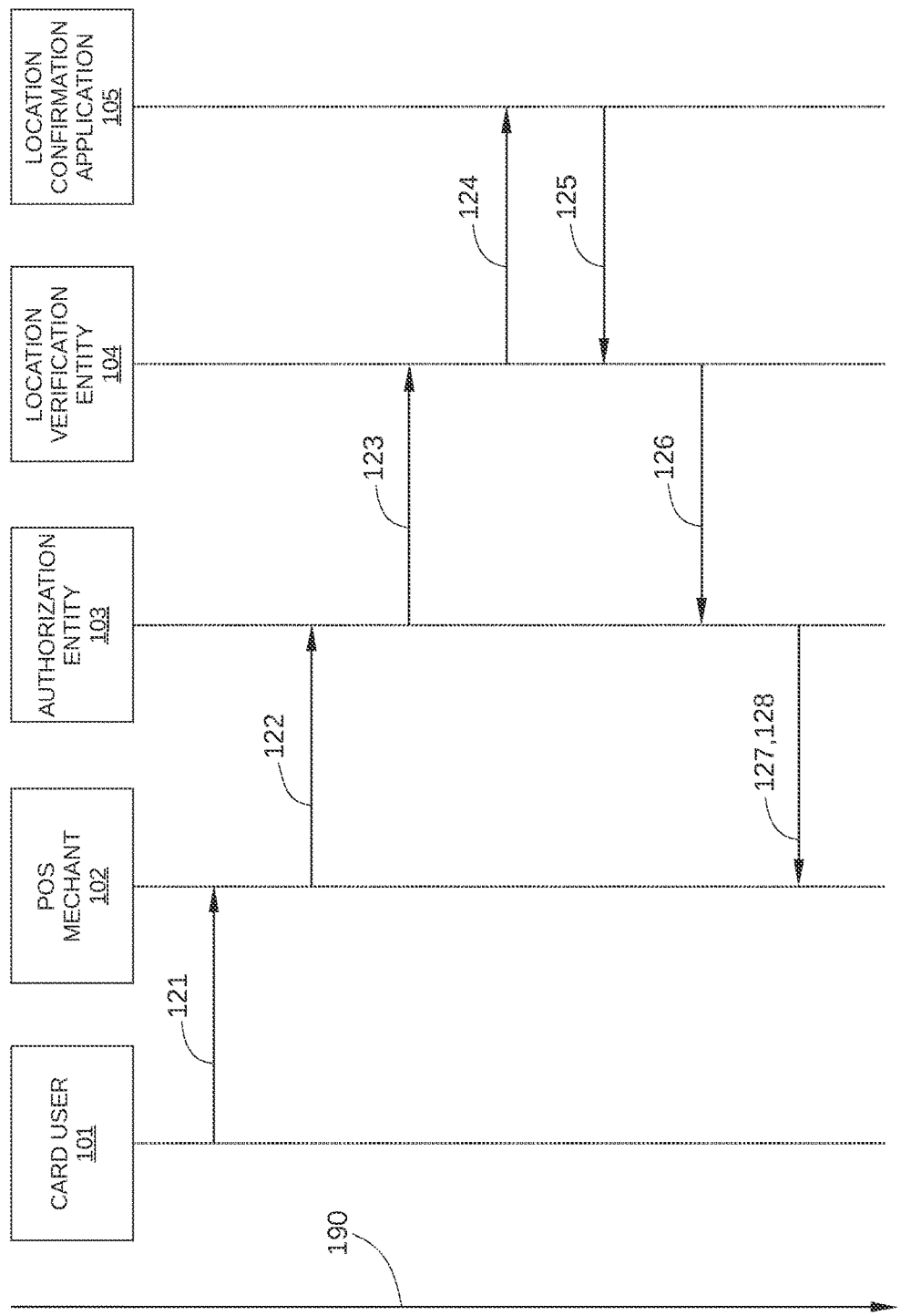
FIG. 2 is a block diagram illustrating the steps of the POS financial transaction illustrated in FIG. 1 as they occur sequentially along a time line, according to one or more embodiments of the invention.

FIG. 1 is a block diagram of a transaction processing system 100 and a point-of-sale (POS) financial transaction carried out according to an embodiment of the present invention. FIG. 2 is a block diagram illustrating the steps of the POS financial transaction illustrated in FIG. 1 as the steps occur sequentially along a time line 190, according to one or more embodiments of the invention.

As described below, transaction processing system 100 enables location-based authentication of a user activity even when a card user 101 has not consented to share location information directly with an authorization entity associated with a user's credit or debit card, e.g., a bank, credit union, or other financial entity. The user activity may be, for example, a debit or credit card transaction taking place at a conventional point-of-sale (POS) location, or a debit card transaction at an automated teller machine (ATM). In conjunction with another authentication factor, such as physical possession of the debit or credit card used in the transaction, transaction processing system 100 can facilitate two-factor authentication of the user activity. In other embodiments, transaction processing system 100 enables location-based authentication of whether an inquiring mobile communication device is within a certain distance (proximity threshold) from another mobile communication device. For example, a car service may want its drivers to confirm how many registered customers are within a certain distance from them. In another example, a dating service may want its registered users to confirm how many other registered customers who have compatible interests are within a certain distance from them.

Transaction processing system 100 may include a POS merchant 102, an authorization entity 103, a location verification entity 104, and a location confirmation application 105, the latter of which runs on a mobile subscriber terminal 110 associated with card user 101 and/or a credit or debit card. In the embodiment illustrated in FIGS. 1 and 2, multiple entities included in transaction processing system 100 each perform different actions of transaction processing system 100. Specifically, authorization entity 103 determines the need for two-factor authentication and whether a debit or credit card transaction 121 is denied or authorized, location verification entity 104 determines if card user 101 is located proximate to POS merchant 102 by querying location confirmation application 105, and location confirmation application 105 determines whether the current location of card user 101 is within a maximum allowable radius of POS merchant 102. In such an embodiment, some or all of the communications described may be transmitted via one or more wireless and/or wired communication networks, such as the Internet, the Signaling System 7 (SS7) network, the Public Switched Telephone Network (PSTN) or a combination thereof. Such communications include an authorization request 122, a location verification request 123, a location query 124, a location response 125, a location verification 126, a transaction authorization 127, and a transaction denial 128. In other embodiments, authorization entity 103 and location verification entity 104 may be configured as a single operational module, and some of the communications described herein may not be transmitted via an external communications network.

Transaction processing system 100 enables authorization entity 103 to approve user activity, such as a financial transaction with POS merchant 102, based on location response 125 from mobile subscriber terminal 110. Location response 125 is typically generated in response to a query (e.g., location query 124) from a location verification entity associated with the debit or credit card (e.g., location verification entity 104), and indicates whether or not the mobile subscriber terminal is within a specified maximum allowable radius of a specific location included in the query, i.e., the location of the user activity. It is noted that no specific location information for mobile subscriber terminal 110 is included in location response 125.

POS merchant 102 may be a point-of-sale or so-called "brick and mortar" merchant that accepts payment using a debit or credit card associated with card user 101. Authorization entity 103 may be any bank, credit union, financial institution, or other entity that can authorize transactions using the credit or debit card associated with card user 101. Location verification entity 104 may be an application that runs on a server or other computing device coupled to the Internet or other communications network and is configured to perform a location verification operation as described herein. Location confirmation application 105 may be an application downloaded to and running on mobile subscriber terminal 110, and may be configured as an authorization or software token that provides two-factor authentication of card user 101.

Mobile subscriber terminal 110 may be a cellular telephone, a smart phone, a personal digital assistant (PDA), a tablet computer, or any other mobile computing device configured to wirelessly access the Internet or other communication network and to practice one or more embodiments of the present invention. Mobile subscriber terminal 110 may include a memory 111, a processor 112, and a wireless communication module 113. Memory 111 may include any suitable volatile and/or nonvolatile memory (e.g., RAM, ROM, flash memory, a magnetic hard drive, etc.), and is configured to store instructions, data, location confirmation application 105, and location information 114. Processor 112 may be any suitable processing unit implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. Wireless communication module may be any suitable electronics package and or chipset configured to enable wireless communication with any wireless network, including cellular networks, Bluetooth networks, and/or WiFi networks.

In operation, card user 101 initiates a credit or debit card transaction 121 at POS merchant 102 by presenting a credit or debit card. POS merchant 102 then submits an authorization request 122 to an authorization entity 103, such as the issuing entity or bank of the credit or debit card. POS merchant 102 accepts the credit card as a form of payment for the purchase only when credit or debit card transaction 121 is authorized by authorization entity 103. Thus, POS merchant 102 completes credit or debit card transaction 121 after receiving transaction authorization 127 from authorization entity 103. According to embodiments of the invention, authorization entity 103 does not authorize credit or debit card transaction 121 unless a two-factor authentication process is successfully completed that includes verification that card user 101 is located within a maximum allowable radius of the location of POS merchant 102. To that end, authorization request 122 includes location information for POS merchant 102 in addition to credit or debit card transaction information that is normally sent to authorization entity 103, such as the name of card user 101 and an account number associated with the debit or credit card.

In some embodiments, when authorization entity 103 receives authorization request 122, authorization entity 103 first determines whether a two-factor authentication process should be implemented, where the authentication process includes verification that card user 101 is located within the maximum allowable radius of the location of POS merchant 102. Such two-factor authentication may be implemented when authorization request 122 is recognized to fall outside the normal pattern of use for the credit or debit card used for credit or debit card transaction 121. For example, POS merchant 102 may be located outside a normal geographical region of use associated with the credit or debit card (e.g., city, country, etc.). Similarly, two-factor authentication may be beneficially implemented by authorization entity 103 when credit or debit card transaction 121 at POS merchant 102 exceeds a predetermined dollar amount, a predetermined frequency of use, and the like. In other embodiments, authorization entity 103 may require two-factor authentication as described herein for all transactions using a particular credit or debit card.

When authorization entity 103 receives authorization request 122 and determines the need for two-factor authentication, authorization entity 103 transmits location verification request 123 to location verification entity 104. In some embodiments, location verification request 123 includes the location of POS merchant 102 (such as global positioning system coordinates and/or latitude-longitude coordinates). Alternatively, location verification entity 104 may already have the location of POS merchant 102 stored locally, in which case location verification request 123 may include information identifying POS merchant 102, but no geographical or location data. Furthermore, in some embodiments, location verification request 123 includes a maximum allowable radius from the location of POS merchant 102, within which mobile subscriber terminal 110 (and presumably card user 101) must be located. Alternatively, such a maximum allowable radius may instead be determined by location verification entity 104, or may be predetermined and included in location confirmation application 105.

Location verification entity 104, upon receiving location verification request 123, determines whether mobile subscriber terminal 110 (and, presumably, card user 101) is located within a maximum allowable radius of POS merchant 102. As noted above, in some embodiments, location verification entity 104 may determine the above-described maximum allowable radius. For example, location verification entity 104 may determine the maximum allowable radius based on one or more of the identity of card user 101 or authorization entity 103, the specific credit or debit card being used in credit or debit card transaction 121, the location of POS merchant 102, etc. Alternatively, authorization entity 103 may provide this maximum allowable radius to location verification entity 104. In either case, location verification entity 104 then determines whether mobile subscriber terminal 110 is located within the maximum allowable radius of POS merchant 102 by transmitting location query 124 to location confirmation application 105 and subsequently receiving location response 125 from location confirmation application 105.

Location query 124 includes the location of POS merchant 102 (for example, global positioning system coordinates and/or latitude-longitude coordinates) and, in some embodiments, the maximum allowable radius (for example in feet, meters, kilometers, etc.). By contrast, location response 125, which is received from location confirmation application 105, includes no geographical location information associated with mobile subscriber terminal 110 and instead includes the equivalent of either a yes or no response. In this way, two-factor authentication based on the current location of card user 101 can be used to authenticate credit or debit card transaction 121 with an automated procedure, even though card user 101 has not consented to continuously share geographical/location information with third parties (such as authorization entity 103 and location verification entity 104). Consequently, credit or debit card transaction 121 can be protected by the additional security associated with two-factor authentication even while card user 101 maintains electronic privacy at all times—except when performing credit or debit card transaction 121. It is noted that by attempting credit or debit card transaction 121, the location of card user 101 is generally revealed and recorded in any case.

Upon receipt of location query 124 from location verification entity 104, location confirmation application 105 determines whether the current location of card user 101 is within a maximum allowable radius from POS merchant 102. Generally, to make such a determination, location confirmation application 105 is configured to use location information 114 (shown in FIG. 1), the location of POS merchant 102 (as provided by location verification entity 104), and the maximum allowable radius from POS merchant 102, where location information 114 includes the current geographical location of mobile subscriber terminal 110. In some embodiments, the maximum allowable radius is included in location query 124, while in other embodiments, the maximum allowable radius or an algorithm for determining the maximum allowable radius may be downloaded as part of location confirmation application 105. When location confirmation application 105 determines that the location of mobile subscriber terminal 110 falls outside the maximum allowable radius from POS merchant 102, location response 125 is transmitted to location verification entity 104 and includes a "NO" indicator. When location confirmation application 105 determines that the location of mobile subscriber terminal 110 falls within the maximum allowable radius from POS merchant 102, location response 125 is transmitted to location verification entity 104 and includes a "YES" indicator. In this way, location confirmation application 105 acts as a software token that provides a second authentication factor for debit or credit card transaction 121.

In some embodiments, location confirmation application 105 stores location information 114 locally in mobile subscriber terminal 110 and may update location information 114 periodically and/or at preprogrammed times. In other embodiments, location confirmation application 105 receives location information 114 from a third party, such as a GPS-based system or cellular or WiFi network to which mobile subscriber terminal 110 is connected or may connect to or any other system capable of tracking the location of mobile subscriber terminal 110. Examples of such systems are described below in conjunction with FIGS. 4-7. In such embodiments, location information 114 may be received periodically from the third party, at preprogrammed times, and/or in response to location query 124 being received from location verification entity 104.

Upon receipt of location response 125 from location confirmation application 105, location verification entity 104 transmits location verification 126 to authorization entity 103. Location verification 126 includes either the "NO" or "YES" indicator from location response 125. When location verification 126 includes the "NO" indicator, authorization entity 103 denies authorization request 122, since an unauthorized user may be fraudulently using the credit or debit card associated with credit or debit card transaction 121. Thus, authorization entity 103 transmits transaction denial 128 to the credit card console located at POS merchant 102, to credit card user 101 directly, or to both POS merchant 102 and credit card user 101. When location verification 126 includes the "YES" indicator, authorization entity 103 transmits authorization request 122, since mobile subscriber terminal 110, which presumably has the same location as card user 101, is located at POS merchant 102. Since the current location of card user 101 is within the maximum allowable radius of the physical location of POS merchant 102, it may be assumed that an unauthorized user is not fraudulently using the credit card for transaction 121. Of course, authorization entity 103 may then further base the authorization of authorization request 122 on other parameters, such as credit limit. Authorization entity 103 then transmits transaction authorization 127 to the credit card console located at POS merchant 102. POS merchant 102 then completes credit or debit card transaction 121.

Figure 3:
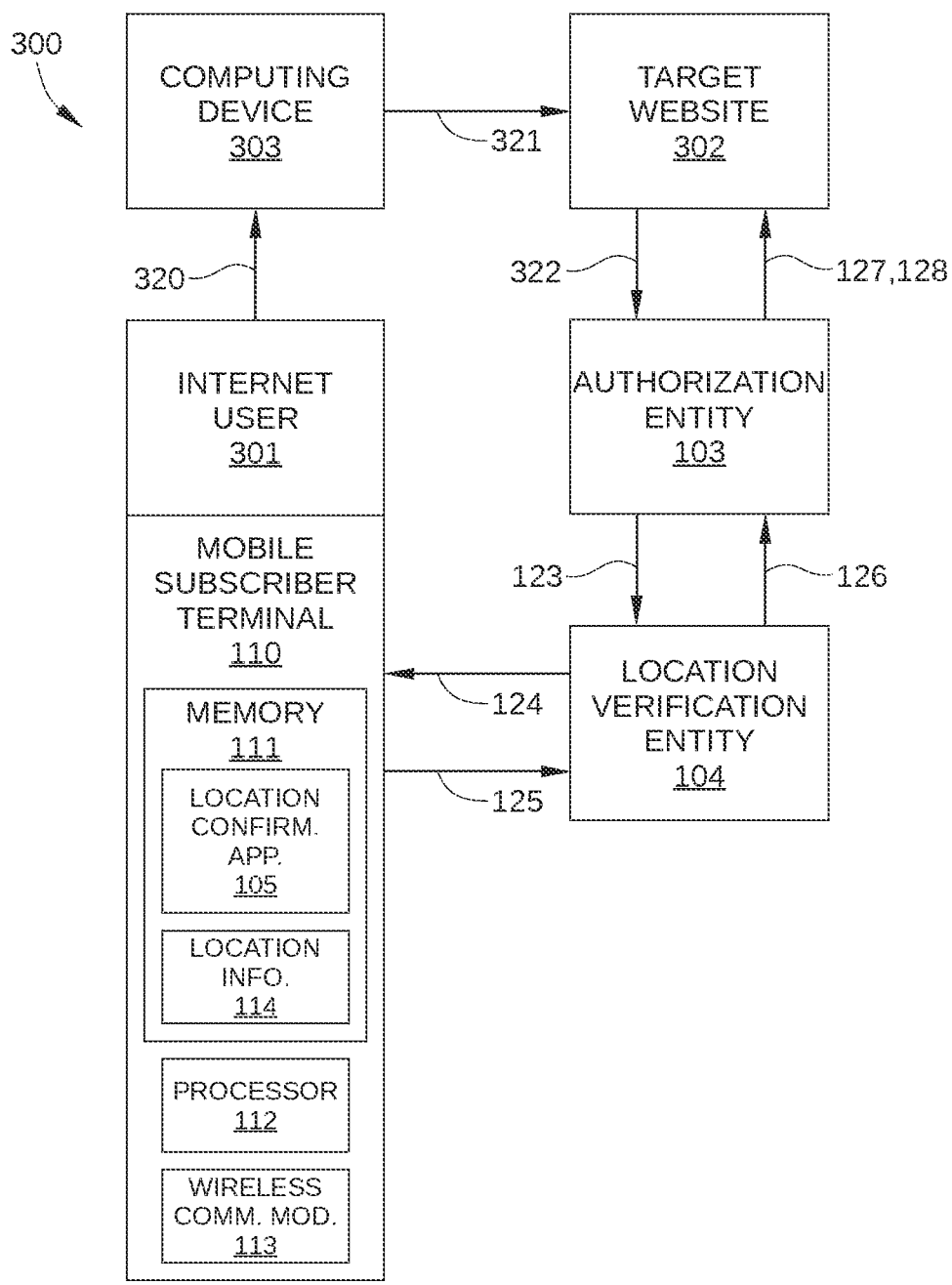
FIG. 3 is a block diagram of a transaction processing system and an online transaction carried out according to an embodiment of the present invention.

In the embodiment illustrated in FIGS. 1 and 2, a transaction using a credit or debit card at POS merchant 102 is depicted. In other embodiments, online transactions may benefit from the use of two-factor authentication that includes verification that the current location of card user 101 is within a maximum allowable radius of a location associated with the online transaction. For example, such a location may be the geographical location associated with the IP address of a computing device associated with the online transaction. In such embodiments, a credit or debit card may not necessarily be used during the online transaction. Moreover, in such embodiments, the online transaction may include accessing an account, such as a bank account, rather than performing a credit or debit card transaction. According to some embodiments, access to the account and/or the completion of the online credit or debit card transaction is contingent on the location of a mobile subscriber terminal associated with the credit or debit card or the account being accessed. Specifically, access to the online account or completion of the online transaction is not authorized unless mobile subscriber terminal is within a maximum allowable radius of the computing device being used to initiate the online transaction or account access. The location of said computing device may be determined from the computer IP address and compared to the current location of a mobile subscriber terminal by a location confirmation application running on the mobile subscriber terminal. FIG. 3 depicts one such embodiment.

FIG. 3 is a block diagram of a transaction processing system 300 illustrating an online transaction carried out according to an embodiment of the present invention. As shown, Internet user 301 uses a first authentication factor 320 to initiate an online transaction 321 using a computing device 303 connected to the Internet, such as a desktop or laptop computer, an electronic tablet, a smart phone, and the like. Via the Internet or other communication network, computing device 303 facilitates online transaction 321 with target website 302. Target website 302 may be the website for an online merchant, a financial institution, and the like. Online transaction 321 may be a financial transaction, such as a purchase, or simply the accessing online of a password-protected account, such as an online bank account.

When online transaction 321 includes a credit or debit card transaction, such as an online purchase, first authentication factor 320 may include a credit or debit card number and/or other billing information. When online transaction 321 includes an access to a password-protected account, first authentication factor 320 may include a user password. Generally, online transaction 321 includes first authentication factor 320 and the IP address (or WiFi SSIDs that are visible) of computing device 303. Upon receipt of transaction 321, target website 302 submits an authorization request 322 to authorization entity 103, and allows the requested online access or completes the requested online transaction when online transaction 321 is authorized by authorization entity 103 via transaction authorization 127.

According to embodiments of the invention, authorization entity 103 does not authorize the transaction associated with authorization request 322 unless a two-factor authentication process involving verification of the location of Internet user 301 is successfully completed. Specifically, transaction authorization 127 is issued by authorization entity 103 if the location of Internet user 301 is verified to be within a maximum allowable radius from the physical location associated with the IP address (or WiFi SSIDs) of computing device 303. Thus, authorization request 322 includes the IP address (or WiFi SSIDs) of and/or location information for computing device 303, in addition to transaction information that is normally sent to authorization entity 103, such as first authentication factor 320. In other respects, transaction processing system 300 is substantially similar in organization and operation to transaction processing system 100 in FIGS. 1 and 2, in that location confirmation application 105 is configured as a software token that provides a location-based authentication factor for online transaction 321, even when Internet user 301 has not consented to continuously provide location information to either authorization entity 103 or location verification entity 104.

As noted above, in some embodiments, location confirmation application 105 may receive location information 114 (shown in FIG. 1) from a third party, such as a GPS-based system or cellular or WiFi network to which mobile subscriber terminal 110 is connected or may connect to or any other system capable of tracking the location of mobile subscriber terminal 110. One such system is illustrated in FIG. 4.

Figure 4:
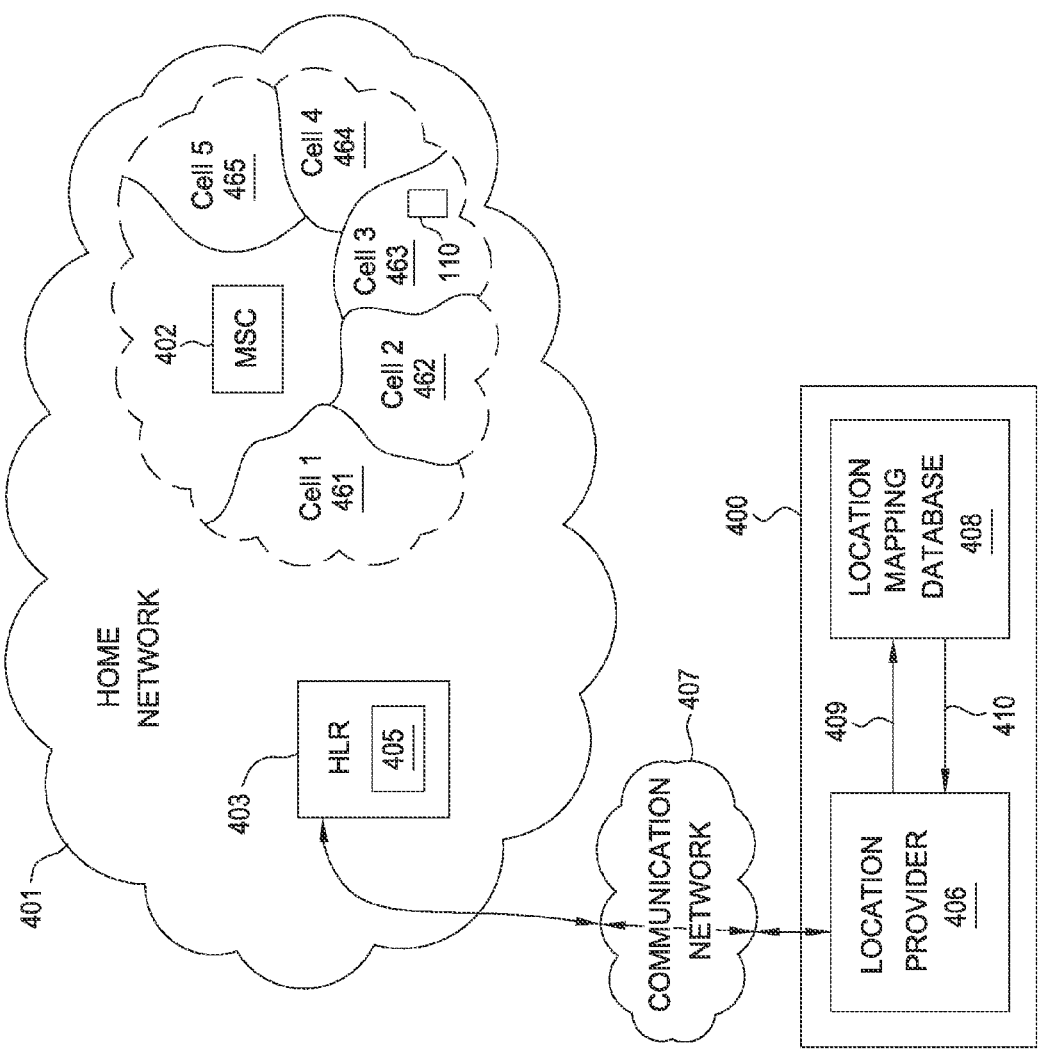
FIG. 4 is a conceptual diagram illustrating a system that enables location tracking of mobile subscriber terminal in a home network, according to an embodiment of the present invention.

FIG. 4 is a conceptual diagram illustrating a system 400 that enables location tracking of mobile subscriber terminal 110 in a home network 401, according to an embodiment of the present invention. Mobile subscriber terminal 110 may be any type of wireless communication device, such as a cell phone, a smart phone, etc. As shown, mobile subscriber terminal 110, and, presumably, the user of mobile subscriber terminal 110, is located in the primary serving network that serves mobile subscriber terminal 110. The primary serving network of mobile subscriber terminal 110 is herein referred to as home network 401, and the user of mobile subscriber terminal 110 is referred to herein as a mobile subscriber.

Home network 401 is a wireless communication system that includes at least one Mobile Switching Center (MSC) 402 serving mobile subscriber terminals, a Home Location Register (HLR) 403, and a plurality of cell towers 461-465. MSC 402 also connects the landline public switched telephone network system to home network 401. Home network 401 may be a small network and only include a single MSC 402. Alternatively, home network 401 may be a relatively large network, i.e., a network that services a large geographical area, and may include multiple MSCs 402. For clarity, only a single MSC 402 is depicted in FIG. 4. Each MSC 402 in home network 401 has a plurality of cell towers 461-465 associated therewith, where each of cell towers 461-465 serves a specific geographical area, i.e., cells 1-5, respectively. HLR 403 of home network 401 contains geographical information regarding mobile subscriber terminal 110, where such geographical information may be a place name, a latitude-longitude coordinate, or a combination of both. Specifically, HLR 403 contains a data structure 405 that identifies the particular MSC 402 currently serving mobile subscriber terminal 110 and the closest cell tower to mobile subscriber terminal 110. Information contained in data structure 405 includes a mobile subscriber identification number, MSC identification number (MSCID), cell tower number, mobile subscriber terminal serial number, an indicator signifying that mobile subscriber terminal 110 is in home network 401, and other information.

System 400 includes a location provider 406 and a location mapping database 408. Location provider 406 is a logical module, program, or algorithm that determines the location of mobile subscriber terminal 110 by querying location mapping database 408. Location mapping database 408 is a data structure that maps each MSC 402 in home network 401 to a specific geographical location. In some embodiments, location mapping database 408 also maps each of cell towers 461-465 to a specific geographical location. In some embodiments, system 400 may be an integral part of the Operational Support System (OSS) of the cellular service provider. Consequently, location provider 406 and location mapping database 408 may be constructed, maintained, and populated by the operator of home network 401. In other embodiments, system 400 may be a separate entity from home network 401 and therefore may be constructed, maintained, and populated by a third party.

Communication between home network 401 and system 400 is carried out via communication network 407. In some embodiments, communication network 407 may comprise the Internet, the Signaling System 7 (SS7) network, the Public Switched Telephone Network (PSTN) or a combination thereof. The SS7 network is used for communicating control, status, and signaling information between nodes in a telecommunication network.

In operation, when mobile subscriber terminal 110 physically enters the geographical region served by home network 401, mobile subscriber terminal 110 registers with home network 401 and MSC 402 captures the identity of the specific cell tower of cell towers 461-465 that is closest to mobile subscriber terminal 110. This registration process enables mobile subscriber terminal 110 to be alerted to an incoming phone-call or message. Calls are completed and messages delivered via this closest cell tower.

As mobile subscriber terminal 110 changes location in home network 401, the identity of the closest cell tower is maintained by MSC 402. Location provider 406 periodically queries HLR 403 via communication network 407 in order to track the current MSC and/or cell tower that is closest to mobile subscriber terminal 110. In some embodiments, the cell phone number associated with mobile subscriber terminal 110 is used to identify mobile subscriber terminal 110. In other embodiments, location provider 406 uses a serialized equipment number associated with mobile subscriber terminal 110 to identify mobile subscriber terminal 110. If the mobile registry is null, i.e., mobile subscriber terminal 110 is not currently registered in home network 401, then a "not-in-network" message is returned to location provider 406 by HLR 403.

After location provider 406 receives a reply from HLR 403 that identifies the closest MSC and/or cell tower to mobile subscriber terminal 110, location provider 406 queries location mapping database 408 via query 409. Query 409 includes the MSCID of said MSC and/or the appropriate cell tower number. Location mapping database 408 then returns the geographical location of MSC 402 to location provider 406 via reply 410. In some embodiments, the granularity of position of mobile subscription terminal 110 is enhanced by also providing cell tower location in reply 410. In other embodiments, inclusion of the geographical location of MSC 402 in reply 410 is sufficient. Thus, location provider 406 is continuously updated with the current geographical location of mobile subscriber terminal 110 and, presumably, the mobile subscriber, and consequently can provide such location information to any authorized party. For example, in some embodiments, system 400 may be configured to provide the current geographical location of mobile subscriber terminal 110 directly to mobile subscriber terminal 110. In other embodiments, system 400 may be configured to provide the current geographical location of mobile subscriber terminal 110 to location verification entity 104 in FIG. 1.

FIG. 5 schematically illustrates the contents of location mapping database 408, according to an embodiment of the invention. As shown, location mapping database 408 provides mappings of MSCs to the physical location of the area served by each MSC. In some embodiments, location mapping database 408 also includes the geographical locations corresponding to each subtending cell tower of each MSC included in mapping database 408.

Figure 6:
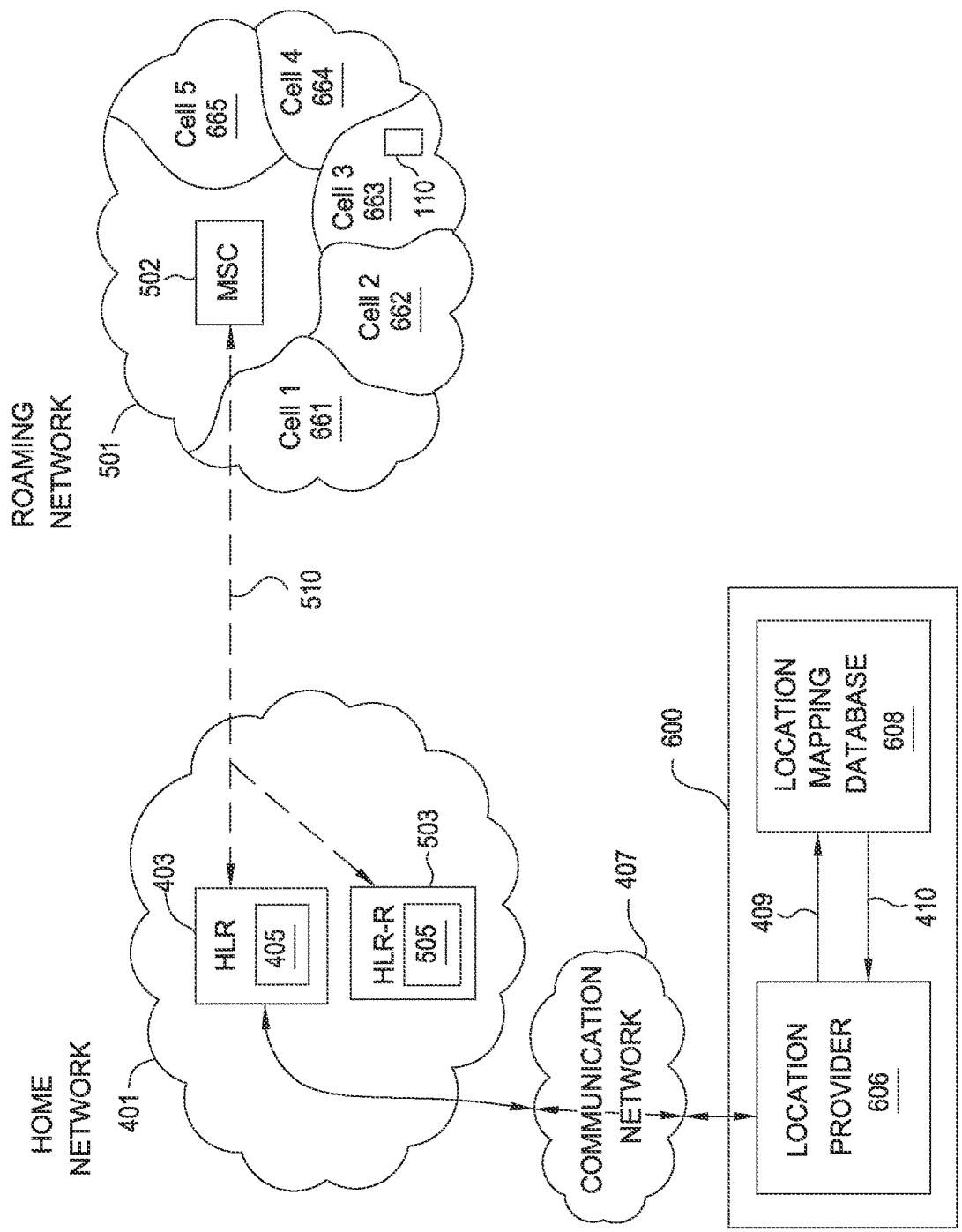
FIG. 6 is a conceptual diagram illustrating a system that enables location tracking of a mobile subscriber terminal roaming mode outside a home network, according to an embodiment of the present invention.

FIG. 6 is a conceptual diagram illustrating a system 600 that enables location tracking of a mobile subscriber terminal 110 in roaming mode outside home network 401, according to an embodiment of the present invention. As shown, mobile subscriber terminal 110, and presumably also the mobile subscriber, is roaming outside home network 401 and is physically located in a roaming network 501, such as a cell phone network in a foreign country.

Roaming network 501 is substantially similar in organization and operation to home network 401, and includes one or more MSCs 502, each with its attendant cell towers 661-665. In addition to HLR 403, home network 401 includes a remote HLR, herein referred to as HLR-R 503. HLR-R 503 contains information regarding the MSC 502 in roaming network 501 in which mobile subscriber terminal 110 has registered. Similar to HLR 403, HLR-R 503 contains geographical information regarding mobile subscriber terminal 110. In contrast to HLR 403, HLR-R 503 contains a data structure 505 that identifies the particular MSC 502 in roaming network 501 that is currently serving mobile subscriber terminal 110. Information contained in data structure 505 includes a mobile subscriber identification number, MSC identification number, mobile subscriber terminal serial number, etc. In some embodiments, data structure 505 may also include the cell tower number of the closest cell tower to mobile subscriber terminal 110.

System 600 is substantially similar in organization and operation to system 400 in FIG. 4. One difference between system 600 and system 400 is that system 600 includes a location mapping database 608, analogous to mapping database 408, that maps each MSC 502 in one or more roaming networks, e.g., roaming network 501, to a specific geographical location. In some embodiments, location mapping database 608 also maps each of cell towers 661-665 to a specific geographical location. In some embodiments the database 608 also maintains a record of the last location mapped for the mobile subscriber terminal.

When mobile subscriber terminal 110 is outside home network 401, roaming network 501 accepts registry of mobile subscriber terminal 110, assuming there is a roaming agreement between the operator of home network 401 and the operator of roaming network 501. As part of normal operation of home network 401 and roaming network 501, the identity of mobile subscriber terminal 110 is communicated over a telephony signaling network 510 to home network 401, together with the appropriate MSC identification for MSC 502 for inclusion in data structure 505, where MSC 502 is the MSC currently serving mobile subscriber terminal 110. Such information that is communicated from roaming network 501 to home network 401 may be maintained in roaming network 501 in a database equivalent to data structure 405 in HLR 403 for mobile subscriber terminals from other networks, i.e., mobile subscriber terminals roaming in roaming network 501. This database containing information related to roaming subscriber units is called the Visitor Location Registry (VLR).

In operation, location provider 606 queries home network 401 regarding the location of mobile subscriber terminal 110. When HLR 403 is queried by location provider 606, mobile subscriber terminal 110 is discovered to be roaming. Location provider 606 then queries HLR-R 503, and receives the MSC ID of MSC 502, which is the MSC currently serving mobile subscriber terminal 110 in roaming network 501. The geographical location of mobile subscriber terminal 110 is then obtained from location mapping database 608 in the same way that system 400 obtains geographical location for mobile subscriber terminal 110 from location mapping database 108. Thus, location provider 606 is continuously updated with the current geographical location of mobile subscriber terminal 110, even when mobile subscriber terminal 110 is located in a foreign country or otherwise roaming outside home network 401. Consequently, location provider 606 can readily provide location information for mobile subscriber terminal 110 to any authorized party, e.g., employer, spouse, bank, online merchant, etc.

Figure 7:
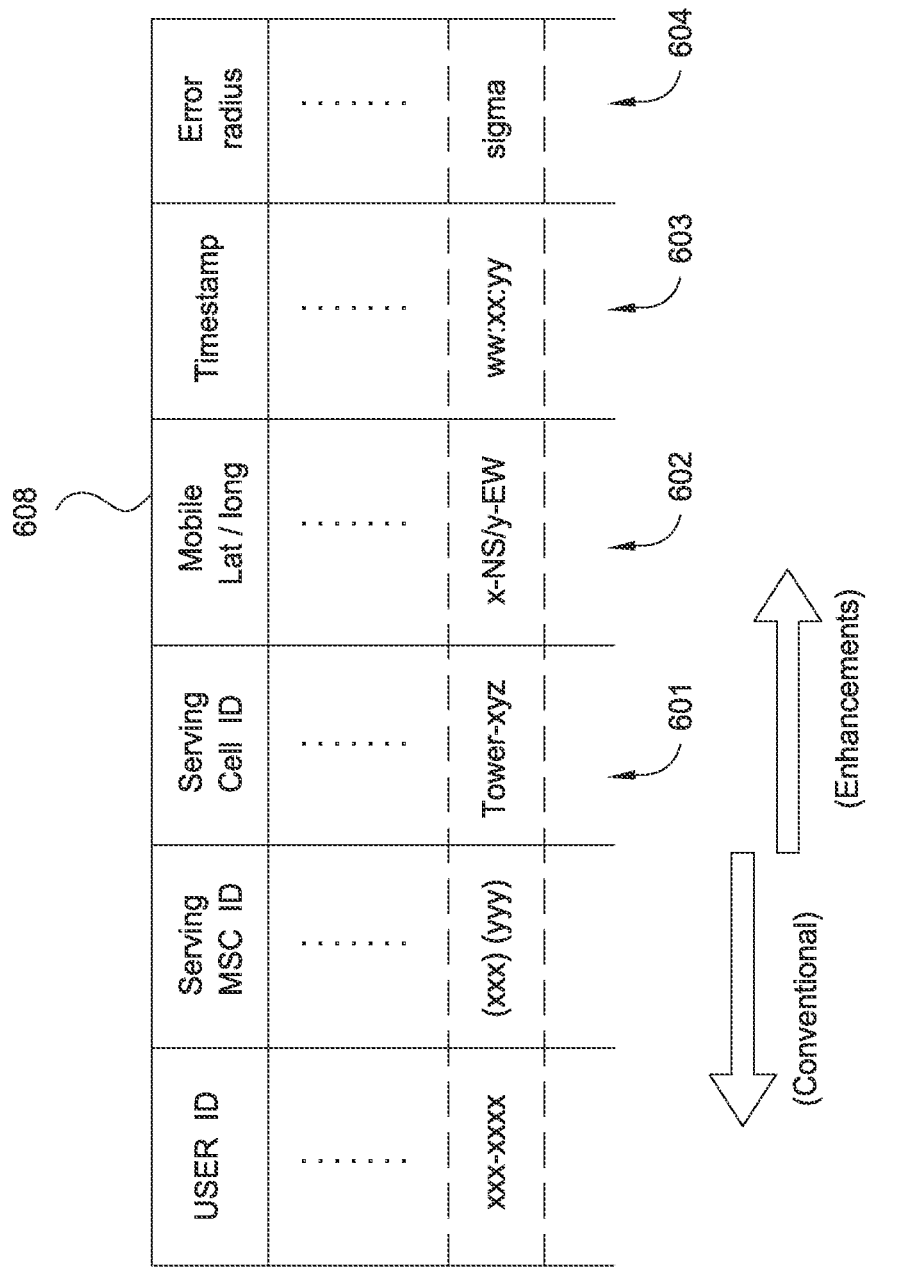
FIG. 7 schematically illustrates the contents of mapping database, according to an embodiment of the invention.

FIG. 7 schematically illustrates the contents of mapping database 608, according to an embodiment of the invention. Location mapping database 608 is substantially similar in organization to mapping database 408, except that, at a minimum, location mapping database 608 provides mappings of roaming MSCs to the physical location of the area served by all included roaming MSCs. Specifically, the roaming MSCs are selected from one or more roaming networks, e.g., roaming network 501, and not home network 401. Other elements of location mapping database 608 that are enhancements over prior art location mapping databases may include serving cell tower ID 601, latitude/longitude coordinate 602, timestamp 603, and error radius 604. The information contained in location mapping database 608 may be generated and maintained by home network 401 by surveying roaming network operators on an on-demand or on a scheduled basis.

Figure 8:
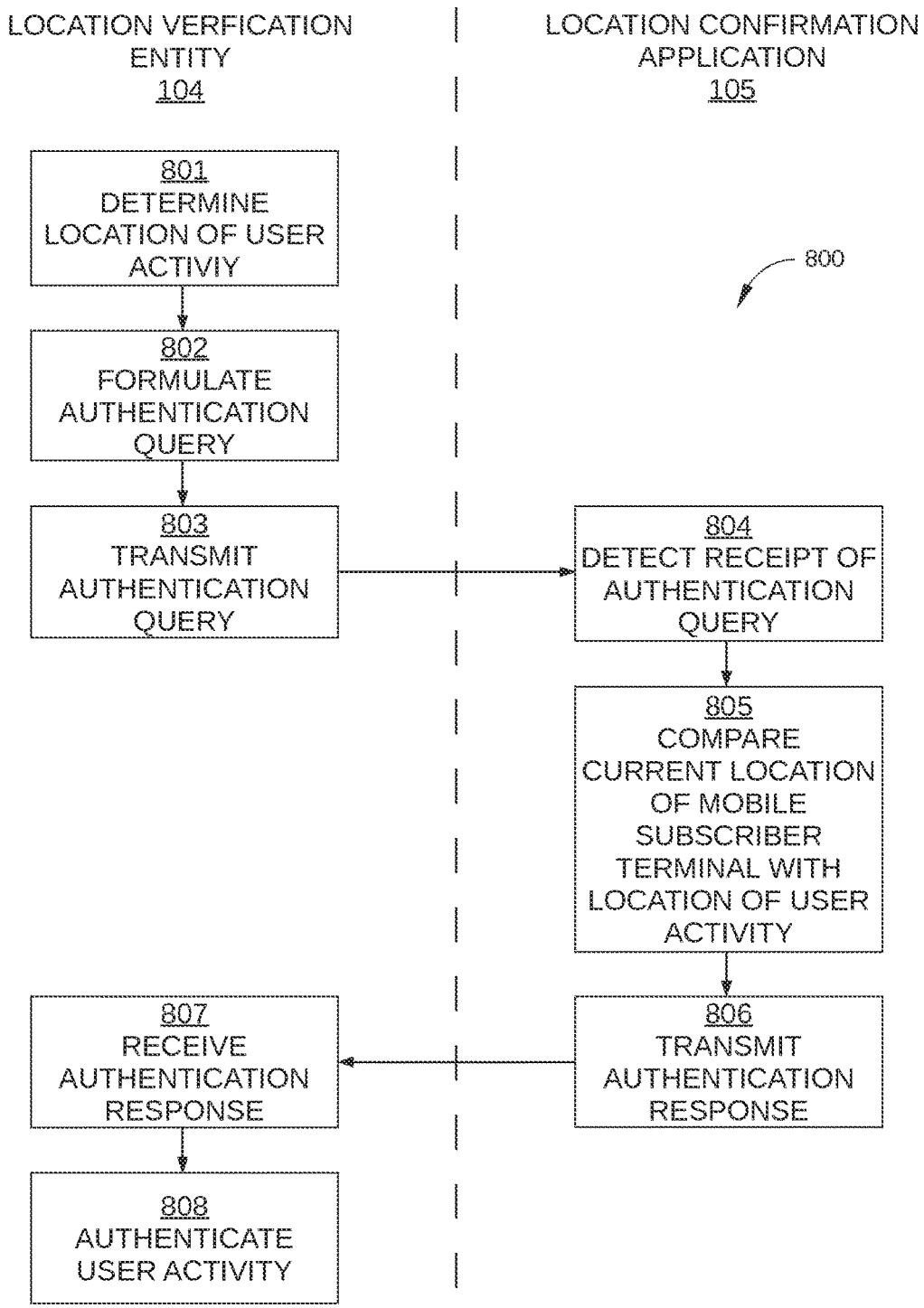
FIG. 8 is a flow chart that summarizes, in a stepwise fashion, a method for authenticating a user activity based on a location of a mobile communication device associated with a user without receiving location data for the device, according to an embodiment of the invention.

FIG. 8 is a flow chart that summarizes, in a stepwise fashion, a method 800 for authenticating a user activity based on a location of a mobile communication device associated with a user without receiving location data for the device, according to an embodiment of the invention. By way of illustration, method 800 is described in terms of a transaction processing system substantially similar in organization and operation to transaction processing system 100 in FIG. 1 and system 300 in FIG. 3. Other transaction processing systems may also benefit from the use of method 800. Although the method steps are described in conjunction with FIGS. 1 and 3, persons skilled in the art will understand that any system configured to perform the method steps falls within the scope of the present invention.

Prior to method 800, the user of mobile subscriber terminal 100 initiates user activity that may require authorization to be completed. In some embodiments, the user activity includes using computing device 303 to perform an online transaction 321, for example requesting access to a secure account via the Internet (see FIG. 3). In other embodiments, the user activity includes attempting to make debit or credit card transaction 121 at POS merchant 102 (see FIG. 1). When the user attempts to initiate the activity, "two-factor" authorization may be implemented via method 800 as described herein. POS merchant 102 or target website 302 then transmits an authentication request (authorization request 122 or authorization request 322, respectively) to an authorization entity, such as authorization entity 103. Authorization entity 103 then transmits location verification request 123 to location verification entity 104.

The method begins in step 801, in which location verification entity 104 determines a location of a user activity that requires authentication. As noted above, the user activity may be debit or credit card transaction 121 or online transaction 321. In some embodiments, location verification entity 104 determines the location of the user activity by receiving data that are transmitted with authorization request 122 or authorization request 322, and which indicate the location of the user activity. For example, geographical coordinates associated with the IP address of computing device 303 or the location of POS merchant 102 may be received in step 801 by location verification entity 104. Alternatively, location verification entity 104 may already have the location of POS merchant 102 or computing device 303 stored locally, in which case location verification request 123 may include information identifying POS merchant 102 or computing device 303, but no explicit geographical or location data.

In step 802, location verification entity 104 formulates an authentication inquiry that includes the location of the user activity. For example, in some embodiments, location verification entity 104 formulates location query 124. In some embodiment, location query 124 includes a maximum allowable radius, as described above, to facilitate the subsequent generation of an authentication response by mobile subscriber terminal 110. In step 803, location verification entity 104 transmits location query 124 to location confirmation application 105, which is running on mobile subscriber terminal 110.

In step 804, location confirmation application 105 in mobile subscriber terminal 110 detects that location query 124 has been received through wireless communication module 113 of mobile subscriber terminal 110. In step 805, responsive to the detection of location query 124 being received through wireless communication module 113, location confirmation application 105 compares location information 114 (i.e., the current location of mobile subscriber terminal 110) with data that are included in location query 124 and indicate the location of the user activity. In step 806, location confirmation application 105 transmits an authentication response (i.e., location response 125) based on the proximity of the current location of mobile subscriber terminal 110 with respect to the location of the user activity. It is noted that location response 125, which is received from location confirmation application 105, includes no geographical location information associated with mobile subscriber terminal 110 and instead indicates whether mobile subscriber terminal 110 is located within the maximum allowable radius from the location of the user activity.

In step 807, location verification entity 104 receives location response 125 from mobile subscriber terminal 110. In step 808, location verification entity 104 authenticates the user activity according to location response 125 received in step 807, for example by transmitting location verification 126 to authorization entity 103. Specifically, when location response 125 indicates that mobile subscriber terminal 110 is located within the maximum allowable radius from the location of the user activity, location response 125 includes a "YES" indicator and authorization entity 103 may authorize the user activity. Alternatively, when location response 125 indicates that mobile subscriber terminal 110 is located outside the maximum allowable radius from the location of the user activity, location response 125 includes a "NO" indicator and authorization entity 103 denies the requested user activity.

In sum, one or more embodiments of the invention provide techniques for providing a two-factor authentication process for a credit card transaction, where the second authentication factor includes verification of user location at the time of the transaction. Advantageously, such verification of user location may be accomplished without user location being continuously tracked. Consequently, convenient and reliable location-based two-factor verification is made possible even when a user of a mobile subscriber terminal has not consented to being continuously tracked.

While the foregoing is directed to embodiments of the present invention, other and further embodiments of the invention may be devised without departing from the basic scope thereof, and the scope thereof is determined by the claims that follow.

We claim:

1. An authentication token implemented in a mobile computing device as a factor for authenticating a user of the mobile computing device by a location verification server based on a location of the user, without an actual location of the user being disclosed to the external server, the mobile computing device comprising:
    a processor;
    a wireless communication module; and
    a system memory, wherein the processor is programmed to perform the steps of:
    detecting that an authentication inquiry has been received from the location verification server through the wireless communication module;
    responsive to the detecting, comparing a current location of the mobile computing device with data that (i) are transmitted from the location verification server with the authentication inquiry and (ii) indicate a first location; and
    transmitting an authentication response to the location verification server based on a proximity of the current location of the mobile computing device with respect to the first location,
    wherein the location verification server authenticates the user based on the authentication response transmitted by the mobile computing device to the location verification server.

2. The authentication token of claim 1, wherein another user's mobile computing device is at the first location.

3. The authentication token of claim 1, wherein the first location is associated with a user activity that requires authentication.

4. The authentication token of claim 3, wherein a credit card or debit card transaction terminal is at the first location and the user activity comprises a credit card or debit card transaction carried out using the credit card or debit card transaction terminal.

5. The authentication token of claim 3, wherein the first location comprises an IP address associated with a computing device used to initiate the user activity.

6. The authentication token of claim 3, wherein the user activity comprises an on-line access of a website.

7. The authentication token of claim 6, wherein the user activity comprises an on-line access of an account associated with the website.

8. The authentication token of claim 1, wherein the processor is programmed to perform the step of receiving the current location of the mobile computing device via the wireless communication module.

9. The authentication token of claim 8, wherein the current location of the mobile computing device is transmitted from a system configured to track the location of the mobile computing device.

10. The authentication token of claim 8, wherein the current location of the mobile computing device is transmitted from a global positioning system.

11. The authentication token of claim 1, wherein the processor is programmed to perform the step of determining the proximity of the current location with respect to the first location based on a maximum allowable radius.

12. The authentication token of claim 11, wherein the processor is programmed to perform the step of receiving the maximum allowable radius in the authentication inquiry.

* * * * *